United States Patent
Ho et al.

(10) Patent No.: US 8,909,662 B2
(45) Date of Patent: Dec. 9, 2014

(54) MESSAGE BASED MOBILE OBJECT WITH NATIVE PIM INTEGRATION

(75) Inventors: Michael Ho, Danville, CA (US); Jean Lau, San Ramon, CA (US); Evan Peter Ireland, Wellington (NZ); Johannes Alberti, San Ramon, CA (US)

(73) Assignee: Sybase, Inc., Dublin, CA (US)

( * ) Notice: Subject to any disclaimer, the term of this patent is extended or adjusted under 35 U.S.C. 154(b) by 1109 days.

(21) Appl. No.: 12/649,527

(22) Filed: Dec. 30, 2009

(65) Prior Publication Data

US 2011/0161383 A1 Jun. 30, 2011

(51) Int. Cl.
*G06F 17/30* (2006.01)

(52) U.S. Cl.
CPC .................... *G06F 17/30575* (2013.01)
USPC ................... 707/759; 707/822

(58) Field of Classification Search
USPC .................................... 707/759, 822
See application file for complete search history.

(56) References Cited

U.S. PATENT DOCUMENTS

| | | | |
|---|---|---|---|
| 6,131,096 A * | 10/2000 | Ng et al. ........................ 1/1 |
| 6,381,241 B1 | 4/2002 | Ghirnikar et al. |
| 6,983,293 B2 | 1/2006 | Wang |
| 7,130,871 B2 | 10/2006 | Acree et al. |
| 7,467,389 B2 | 12/2008 | Mukkamala et al. |
| 7,512,638 B2 | 3/2009 | Jhaveri et al. |
| 7,606,838 B2 | 10/2009 | Tobies |
| 7,620,659 B2 | 11/2009 | Novik et al. |
| 7,660,830 B2 | 2/2010 | Ordille |
| 7,778,962 B2 | 8/2010 | Shah et al. |
| 7,805,420 B2 | 9/2010 | Kapoor et al. |
| 7,853,561 B2 | 12/2010 | Holenstein et al. |
| 7,882,062 B2 | 2/2011 | Holenstein et al. |
| 7,962,458 B2 * | 6/2011 | Holenstein et al. ........... 707/704 |
| 8,037,056 B2 | 10/2011 | Naicken et al. |
| 8,046,424 B2 | 10/2011 | Novik et al. |
| 8,086,661 B2 | 12/2011 | Holenstein et al. |
| 8,131,670 B2 | 3/2012 | i Dalfo et al. |
| 8,166,101 B2 | 4/2012 | Shah |
| 8,200,246 B2 | 6/2012 | Khosravy et al. |
| 8,218,549 B2 | 7/2012 | Dekel et al. |

(Continued)

FOREIGN PATENT DOCUMENTS

| | | |
|---|---|---|
| KR | 10-2003-0072693 A | 9/2003 |
| KR | 10-2006-0060629 A | 6/2006 |
| KR | 10-2011-0074059 A | 6/2011 |

OTHER PUBLICATIONS

Notification of Transmittal of the International Search Report and Written Opinion, dated Mar. 18, 2010, for PCT Appl. No. PCT/US2009/004343, 11 pages.

(Continued)

*Primary Examiner* — Noosha Arjomandi
(74) *Attorney, Agent, or Firm* — Sterne, Kessler, Goldstein & Fox P.L.L.C.

(57) ABSTRACT

Systems, methods, and computer program products are provided for synchronizing data within a native PIM data store in a device an enterprise data. Data modifications generated by mobile applications on the device, or by an enterprise server, are identified and reflected into the native PIM data store. Additionally, a listener is provided to detect modifications to relevant data within the native PIM data store and reflect these modifications in the mobile applications and the enterprise server. The framework which accomplishes this further provides platform-independent access to the native PIM data store.

18 Claims, 7 Drawing Sheets

(56) References Cited

U.S. PATENT DOCUMENTS

| | | | |
|---|---|---|---|
| 8,238,696 | B2 | 8/2012 | Dart et al. |
| 8,326,279 | B2 * | 12/2012 | Aftab et al. .................. 455/419 |
| 8,412,675 | B2 * | 4/2013 | Alvarado et al. ............. 707/616 |
| 2003/0110085 | A1 | 6/2003 | Murren et al. |
| 2004/0001498 | A1 | 1/2004 | Chen et al. |
| 2004/0044703 | A1 * | 3/2004 | Wildhagen et al. ........... 707/203 |
| 2004/0133599 | A1 | 7/2004 | Warren et al. |
| 2004/0133644 | A1 | 7/2004 | Warren et al. |
| 2004/0148420 | A1 | 7/2004 | Hinshaw et al. |
| 2004/0205770 | A1 | 10/2004 | Zhang et al. |
| 2005/0021354 | A1 | 1/2005 | Brendle et al. |
| 2005/0055465 | A1 | 3/2005 | Sato |
| 2005/0055698 | A1 | 3/2005 | Sasaki et al. |
| 2005/0268032 | A1 | 12/2005 | Sikdar et al. |
| 2006/0112398 | A1 | 5/2006 | Mukkamala et al. |
| 2006/0123010 | A1 | 6/2006 | Landry et al. |
| 2007/0073808 | A1 * | 3/2007 | Berrey et al. ................. 709/204 |
| 2007/0099640 | A1 | 5/2007 | Khushu et al. |
| 2007/0100834 | A1 | 5/2007 | Landry et al. |
| 2007/0260475 | A1 | 11/2007 | Bhanote |
| 2007/0260628 | A1 | 11/2007 | Fuchs et al. |
| 2007/0260751 | A1 * | 11/2007 | Meesseman .................. 709/248 |
| 2007/0271275 | A1 | 11/2007 | Fassette et al. |
| 2008/0104133 | A1 | 5/2008 | Chellappa et al. |
| 2008/0120304 | A1 | 5/2008 | Calio et al. |
| 2008/0155525 | A1 | 6/2008 | Ho |
| 2008/0176536 | A1 * | 7/2008 | Galluzzo et al. ............ 455/414.1 |
| 2009/0036102 | A1 | 2/2009 | Ho |
| 2009/0037395 | A1 | 2/2009 | Ireland et al. |
| 2009/0037430 | A1 | 2/2009 | Mukkamala et al. |
| 2009/0059512 | A1 | 3/2009 | Lydon et al. |
| 2009/0171679 | A1 | 7/2009 | Salgado et al. |
| 2009/0177800 | A1 | 7/2009 | Gidron et al. |
| 2009/0187622 | A1 | 7/2009 | Xie |
| 2009/0198772 | A1 | 8/2009 | Kim et al. |
| 2009/0222402 | A1 | 9/2009 | Tysowski |
| 2009/0247134 | A1 | 10/2009 | Jeide et al. |
| 2009/0254601 | A1 | 10/2009 | Moeller et al. |
| 2009/0293069 | A1 * | 11/2009 | Yang et al. .................... 719/318 |
| 2009/0307284 | A1 | 12/2009 | Welingkar et al. |
| 2010/0011075 | A1 * | 1/2010 | Klassen et al. ................ 709/206 |
| 2010/0030783 | A1 | 2/2010 | Ho et al. |
| 2010/0169451 | A1 * | 7/2010 | Barry ............................ 709/207 |
| 2011/0154315 | A1 | 6/2011 | Singh et al. |
| 2011/0161290 | A1 | 6/2011 | Waterman et al. |
| 2011/0161339 | A1 * | 6/2011 | Ireland et al. ................. 707/759 |
| 2011/0161349 | A1 | 6/2011 | Ireland et al. |
| 2012/0158795 | A1 | 6/2012 | Ireland |
| 2012/0158828 | A1 | 6/2012 | Ireland et al. |
| 2012/0166446 | A1 | 6/2012 | Bowman et al. |

OTHER PUBLICATIONS

Notification of Transmittal of the International Search Report and Written Opinion, dated Jul. 28, 2011, for PCT Appl. No. PCT/US2010/060290, 10 pages.

Notification of Transmittal of the International Search Report and Written Opinion, dated Aug. 2, 2011, for PCT Appl. No. PCT/US2010/060293, 11 pages.

Notification of Transmittal of the International Search Report and Written Opinion, dated Aug. 5, 2011, for PCT Appl. No. PCT/US2010/060296, 9 pages.

English Abstract for Korean Patent Pub. No. 10-2003-0072693 A, published Sep. 19, 2003, 1 page, from http://worldwide.espacenet.com.

English Abstract for Korean Patent Pub. No. 10-2006-0060629 A, published Jun. 5, 2006, 1 page, from http://worldwide.espacenet.com.

English Abstract for Korean Patent Pub. No. 10-2011-0074059 A, published Jun. 30, 2011, 1 page, from http://worldwide.espacenet.com.

Sinitsyn, A. "A Synchronization Framework for Personal Mobile Servers," *Second IEEE Annual Conference on Pervasive Computing and Communications, Includes Workshop Papers,* Orlando, Florida, pp. 1-5, Mar. 14-17, 2004.

Office Communication, dated Sep. 19, 2011, for U.S. Appl. No. 12/503,573, filed Jul. 15, 2009, 12 pages.

Linthicum, David S., "Chapter 20: EAI Moving Forward," In *Enterprise Application Integration,* Addison-Wesley, XP000002659187, ISBN: 0-201-61583-5, pp. 339-349, May 1, 2000.

Linthicum, David S., "Chapter 11: Database-Oriented Middleware and EAI", In *Enterprise Application Integration,* Addison-Wesley, XP002579155, ISBN: 978-0-201-61583-8, May 1, 2000.

Extended European Search Report, dated Sep. 27, 2011, for European Patent Appl. No. 09803252.7, 7 pages.

Office Communication, dated Sep. 25, 2012, for U.S. Appl. No. 12/813,104, filed Jun. 10, 2010, 14 pages.

Office Communication, dated Aug. 27, 2012, for U.S. Appl. No. 13/286,372, filed Nov. 1, 2011, 12 pages.

Aboulnaga, A. and Aref, W. G., "Window Query Processing in Linear Quadtrees," in Distributed and Parallel Databases, vol. 10, pp. 111-126 (2001).

Aref, W. G. and Samet, H., "Efficient Window Block Retrieval in Quadtree-Based Spatial Databases," in GeoInformatica, vol. 1, Chapter 1, pp. 59-91 (Apr. 1997).

Aref, W. G. and Samet, H., "Estimating Selectivity Factors of Spatial Operations," in Foundations of Models and Languages for Data and Objects, A. Heuer, & M. H. Scholl edition, pp. 31-43 (Aug. 14, 1993).

Fang, Y. et al., "Spatial Indexing in Microsoft SQL Server 2008," in Proceedings of the 2008 ACM SIGMOD International Conference on Arrangement of Data, ACM, New York, NY, pp. 1207-1215 (2008).

Gargantini, I., "An Effective Way to Represent Quadtrees," in Communications of the ACM, vol. 25, No. 12, ACM, New York, NY, pp. 905-910 (Dec. 1982).

Kothuri, R. K. V. et al., "Quadtree and R-Tree Indexes in Oracle Spatial: A Comparison Using GIS Data," in Proceedings of the 2002 ACM SIGMOD International Conference on Management of Data, ACM, New York, NY, pp. 546-557 (2002).

Kriegel, H.-P. et al., "Statistic Driven Acceleration of Object-Relational Space-Partitioning Index Structures," in Database Systems for Advances Applications, 14 pages, Jeju Island, Korea, Springer (2004).

Orenstein, J. A., "Redundancy in Spatial Databases," in Proceedings of the 1989 ACM SIGMOD International Conference on Management of Data, ACM, New York, NY, USA, pp. 294-305 (1989).

Samet, H., *Foundations of Multidimensional and Metric Data Structures,* Morgan Kaufmann, pp. 28-48, 191-193, 204-205, and 211-220 (2006).

International Search Report and Written Opinion for International Application No. PCT/US2011/065197, dated May 29, 2012, 9 pages.

Office Action mailed Apr. 25, 2012 in U.S. Appl. No. 12/503,573, Ho et al., filed Jul. 15, 2009, 14 pages.

Office Action mailed Jan. 3, 2012 in U.S. Appl. No. 12/760,233, Waterman et al., filed Apr. 14, 2010, 8 pages.

Office Action mailed Jul. 3, 2012 in U.S. Appl. No. 12/760,233, Waterman et al., filed Apr. 14, 2010, 9 pages.

Office Action, mailed Mar. 7, 2012 in U.S. Appl. No. 12/797,975, Ireland et al., filed Jun. 10, 2010, 8 pages.

Office Action, mailed Jun. 27, 2012 in U.S. Appl. No. 12/797,975, Ireland et al., filed Jun. 10, 2010, 9 pages.

Office Action mailed Apr. 11, 2012, for U.S. Appl. No. 12/813,104, Ireland et al., filed Jun. 10, 2010, 16 pages.

U.S. Appl. No. 13/478,181, Lorenz et al., filed May 23, 2012, entitled "Cache Conflict Detection".

U.S. Appl. No. 13/478,185, Lorenz et al., filed May 23, 2012, entitled "Composite Graph Cache Management".

* cited by examiner

MESSAGE BASED MOBILE OBJECT WITH NATIVE PIM INTEGRATION

CROSS-REFERENCE TO RELATED APPLICATIONS

The present application is related to co-pending U.S. patent application No. 61/290,990, filed on Dec. 30, 2009 and entitled "Message Based Synchronization for Mobile Business Objects" and U.S. patent application No. 61/290,993, filed on Dec. 30, 2009 and entitled "Pending State Management for Mobile Business Objects", which are incorporated herein by reference in their entireties.

BACKGROUND OF INVENTION

1. Field of the Invention

The present invention relates generally to mobile devices, and, more specifically, to synchronization of native PIM data with mobile applications.

2. Description of the Background Art

Mobile devices, such as cellular telephones, have evolved into personal organizers holding all manner of information, including contact information, events, tasks, and related functionality. Often, these devices will come equipped with integrated software to provide this functionality, such as e-mail and calendaring applications.

Being designed by, or in cooperation with, the mobile device manufacturer, these integrated software applications are able to leverage the mobile device's Personal Information Management ("PIM") functions in order to store information such as contacts and calendar events. In an effort to allow other developers to expand the capabilities of their mobile device, the mobile device manufacturer will also generally provide an application programming interface ("API") to the PIM store for developers to interact with the locally stored data.

Access to the PIM store allows third party applications to, for example, provide additional views of data stored on the mobile device. For example, a mapping application may be able to take contact information stored in the PIM and use it to create a route to the contact's location. The difficulty of this is, however, that the application developer must follow the access conventions stipulated by the mobile device's particular PIM API. These APIs are by no means standardized, and different mobile devices even provide different data storage capabilities.

As a result, the software development process involving PIM data mobile devices is slowed. Additionally, there is no effective way to synchronize data in a local PIM store across an enterprise without purpose-built software.

Accordingly, what is desired is PIM integration for mobile applications.

SUMMARY OF INVENTION

Embodiments of the invention include a method comprising receiving a data modification message in a communication framework on a device, the communication framework configured to provide platform-independent communications between a mobile application and an enterprise server, identifying a modification to personal information management ("PIM")-related data within the message, and updating a native PIM store within the device based on the message.

Embodiments of the invention also include a computer-readable medium having computer-executable instructions stored thereon that, if executed by a computing device, cause the computing device to perform a method comprising receiving a data modification message in a communication framework on a device, the communication framework configured to provide platform-independent communications between a mobile application and an enterprise server, identifying a modification to personal information management ("PIM")-related data within the message, and updating a native PIM store within the device based on the message.

Embodiments of the invention also include a system comprising a memory configured to store modules comprising a receiving module configured to receive a data modification message in a communication framework on a device, the communication framework configured to provide platform-independent communications between a mobile application and an enterprise server, an identifying module configured to identify a modification to personal information management ("PIM")-related data within the message, and an updating module configured to update a native PIM store within the device based on the message, and one or more processors configured to process the modules.

Embodiments of the invention also include a method comprising monitoring a native personal information management ("PIM") store within a device for data modifications therein, detecting a modification to data within the native PIM store, notifying a mobile application executing on the device of the modification, and transmitting a message reflecting the modification to an enterprise server using a communication framework configured to provide platform-independent communications between the mobile device and the enterprise server.

Embodiments of the invention also include a computer-readable medium having computer-executable instructions stored thereon that, if executed by a computing device, cause the computing device to perform a method comprising monitoring a native personal information management ("PIM") store within a device for data modifications therein, detecting a modification to data within the native PIM store, notifying a mobile application executing on the device of the modification, and transmitting a message reflecting the modification to an enterprise server using a communication framework configured to provide platform-independent communications between the mobile device and the enterprise server.

Embodiments of the invention also include a system comprising a memory configured to store modules comprising a monitoring module configured to monitor a native personal information management ("PIM") store within a device for data modifications therein, a detecting module configured to detect a modification to data within the native PIM store, a notifying module configured to notify a mobile application executing on the device of the modification, and a transmitting module configured to transmit a message reflecting the modification to an enterprise server using a communication framework configured to provide platform-independent communications between the mobile device and the enterprise server, and one or more processors configured to process the modules.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
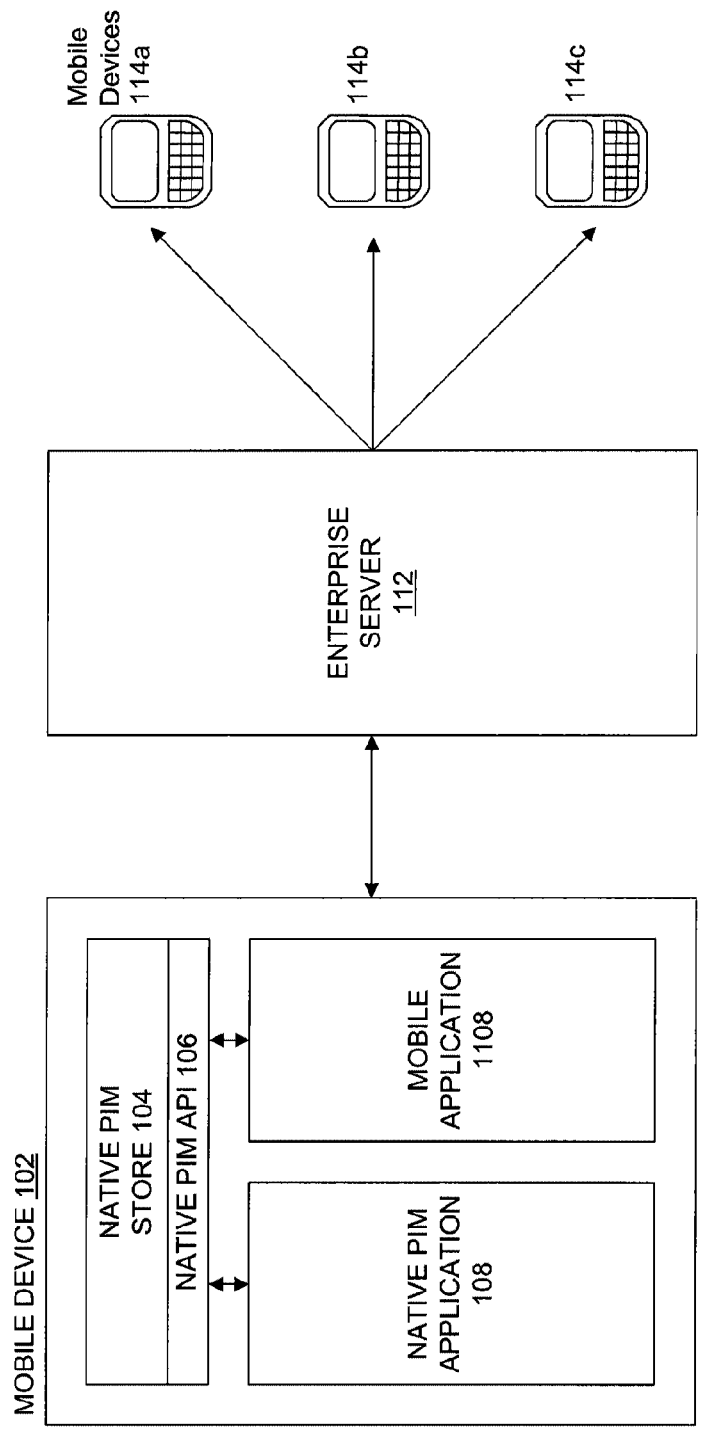
FIG. 1 is an exemplary enterprise network in which a mobile device is connected to an enterprise server.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, and within the scope and spirit of the present invention.

Reference to modules in this specification and the claims means any combination of hardware or software components for performing the indicated function. A module need not be a rigidly defined entity, such that several modules may overlap hardware and software components in functionality. For example, a software module may refer to a single line of code within a procedure, the procedure itself being a separate software module. One skilled in the relevant arts will understand that the functionality of modules may be defined in accordance with a number of stylistic or performance-optimizing techniques, for example.

FIG. 1 is an exemplary enterprise network 100 in which a mobile device 102 is connected to an enterprise server 112. This connection is generally over a wide area network, such as the Internet, but can be any other communications means.

In this example network, mobile device 102 has a native PIM store 104 which applications can interface through the use of native PIM API 106. As further shown, native PIM application 108, such as a phone dialer with contacts list built-in to a telephone mobile device, is designed to interface with the PIM store 104 through the PIM API 106. However, the PIM API 106 is the only means of access to the native PIM store 104, so a mobile application 110 must also use the PIM API 106 to access the PIM store 104.

The configuration shown in FIG. 1 therefore requires that a developer of mobile application 110 write the application specifically to use the native PIM API 106 of mobile device 102. However, different mobile devices, such as mobile devices 114a-c, each have their own APIs for interfacing their respective PIM stores, requiring that the mobile application 110 developer create a number of versions of the application targeted to each mobile platform. For example, the API for interfacing PIM stores within the APPLE IPHONE, developed by APPLE COMPUTER, INC. of Cupertino, Calif. is different from the API for interfacing PIM stores within the BLACKBERRY, developed by RESEARCH IN MOTION of Waterloo, Ontario, Canada.

The configuration shown in FIG. 1 misses many opportunities to fully utilize the capabilities provided by an integral data store such as the PIM store. This is resolved using the mechanisms detailed herein.

II. Integration with Native PIM Stores

Figure 2:
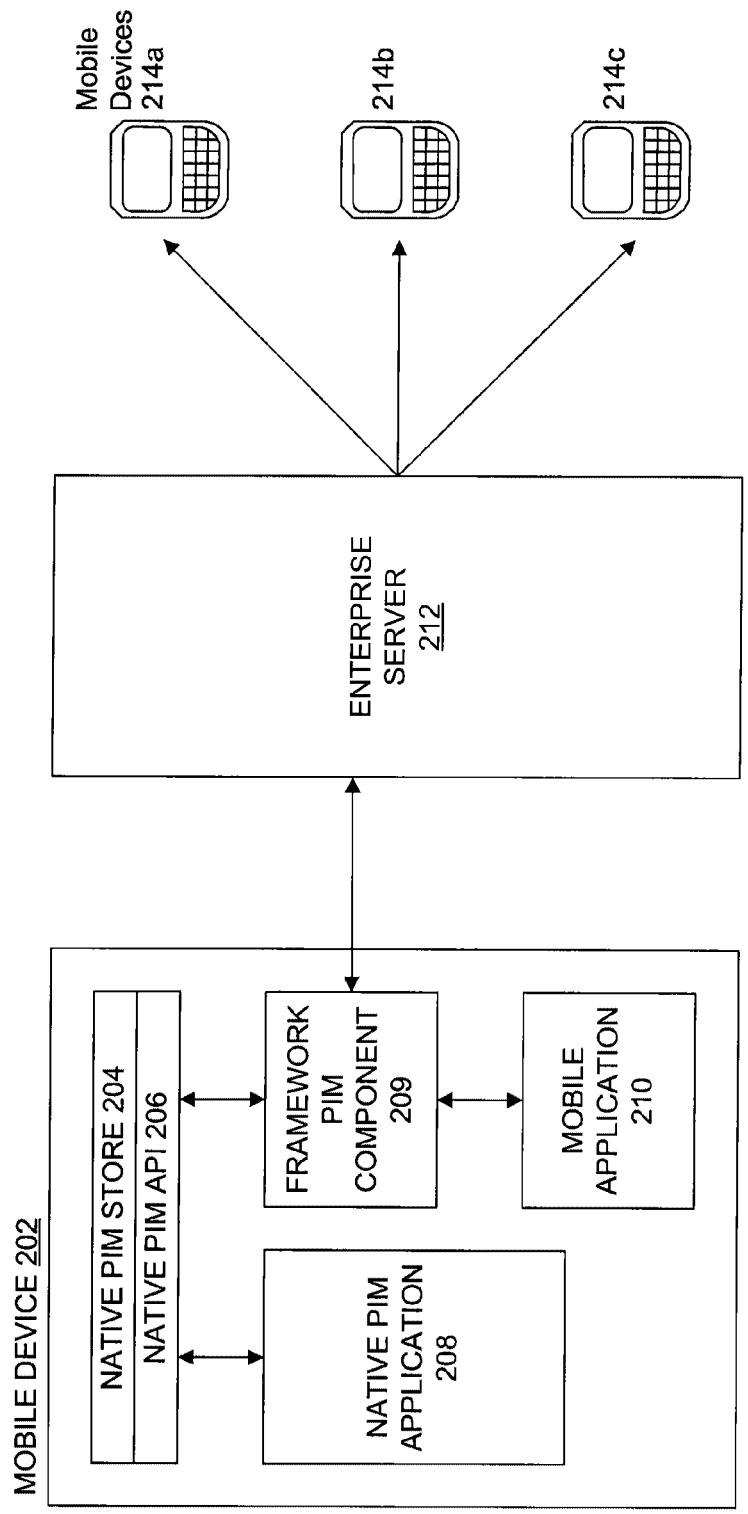
FIG. 2 is an enterprise network, in accordance with an embodiment of the present invention.

FIG. 2 is an enterprise network 200, in accordance with an embodiment of the present invention. Similar to FIG. 1, network 200 comprises a mobile device 202 in communication with an enterprise server 212 via a wireless and/or wired communication network, such as, but not limited to, the Internet. One skilled in the relevant arts will appreciate that a number of communication networks may be used, including communications via several wireless and/or wired communication networks (e.g., cellular provider network hops combined with Internet backbone hops).

As before, mobile device 202 comprises a native PIM store 204 with a native PIM API 206. Native PIM application 208, such as integrated calendar software, is designed to use this native PIM API 206 to readily interface with the PIM store 204 capabilities of the mobile device 202. One skilled in the relevant arts will further appreciate that PIM API 206 may be provided solely for the benefit of third party developers, and native PIM application 208 may communicate with native PIM store 204 using lower-level functionality or undocumented procedures, based on the level of familiarity developers of native PIM application 208 would have with the mobile device 202.

Here, however, mobile device 202 further comprises a framework PIM component 209, in accordance with an embodiment of the present invention. This component provides a framework which developers of mobile application 210 can target regardless of the particular requirements of mobile device 202, in accordance with a further embodiment of the present invention.

Framework PIM component 209 is part of a larger framework which enables communications between mobile application 210 and enterprise server 212, in accordance with an embodiment of the present invention. Such communication between mobile application 210 and enterprise server 212 is in the form of Mobile Business Objects ("MBOs"), which are a representation of a subset of data contained in enterprise server 212, in accordance with a further embodiment of the present invention. A non-limiting example of MBOs is provided in U.S. patent application Ser. No. 12/503,573, filed on Jul. 15, 2009, entitled "Metadata Driven Mobile Business Objects," which is incorporated by reference herein in its entirety.

Mobile application 210 can receive MBOs from enterprise server 212 containing data which would duplicate functionality provided by the native PIM store 204, in accordance with an embodiment of the present invention. For example, mobile application 210 can synchronize contacts for an enterprise by receiving the appropriate MBOs from enterprise server 212. Mobile application 210 could update a contact, for example, and enterprise server 212 could provide these updates to other mobile devices 214a-c in the enterprise network 200.

By updating the native PIM store 204 to include data shared and received by mobile application 210, it is possible to access this data using native PIM application 208 without the need to open mobile application 210. For example, if the data exchanged by mobile application 210 with enterprise server 212 is in the form of contact information for employees within an enterprise, it would be advantageous to allow a user to call one of the employees using this contact information directly from the mobile device's 202 built-in dialer without having to first open mobile application 210.

In accordance with an embodiment of the present invention, framework PIM component 209, as part of the framework enabling communications between mobile application 210 and enterprise server 212, provides a layer of abstraction between mobile application 210 and native PIM store 204. This allows a mobile application 210 developer to access native PIM store 204 using an interface provided by framework PIM component 209, rather than coding directly for native PIM API 206. In accordance with an embodiment of the present invention, framework PIM component 209 is provided for a number of mobile device 202 platforms in order to interface with each platform's unique native PIM API 206. However, these differences are not exposed to mobile application 210, who simply sees the common interface provided by framework PIM component 209.

As noted, one of the advantages of framework PIM component 209 is the ability to provide a common access methodology to native PIM store 204 regardless of target platform, in accordance with an embodiment of the present invention. However, different native PIM stores 204 have different capabilities, and it is useful to have some way to account for this. For example, a contact within one mobile device's 202 native PIM store may have more fields (e.g., address lines 1, 2, and 3) than the native PIM store of another device (e.g., having only address lines 1 and 2).

A PIM data model is used to abstract the native PIM store 204 for different devices, using an XML document to create a mapping between node fields in a special PIM MBO and fields in the PIM data model, in accordance with an embodiment of the present invention. The PIM MBO can be defined in accordance with non-limiting examples shown in U.S. patent application Ser. No. 12/503,573, filed on Jul. 15, 2009, entitled "Metadata Driven Mobile Business Objects," which is incorporated by reference herein in its entirety. One skilled in the relevant arts will appreciate that other communication formats besides MBOs can be used to communicate PIM data, and the use of MBOs is provided by way of example, and not limitation.

Information is shared between mobile application 210 and enterprise server 212 via framework PIM component 209 using this PIM MBO. Data-containing nodes within the PIM MBO are flagged to indicate whether they contain data that needs to be updated to the native PIM store 204, in accordance with an embodiment of the present invention. The mapping of these nodes to fields in the PIM data model provided by the XML document can further be edited by a developer in order to ensure useful storage of data within the native PIM store 204, so that data from different fields (e.g., two address lines vs. three address lines) are properly utilized, in accordance with an embodiment of the present invention.

Various ways in which data is accessed and updated within the native PIM store 204 are now discussed.

III. Data Creates, Updates, or Deletions by Mobile Application

Figure 3A:
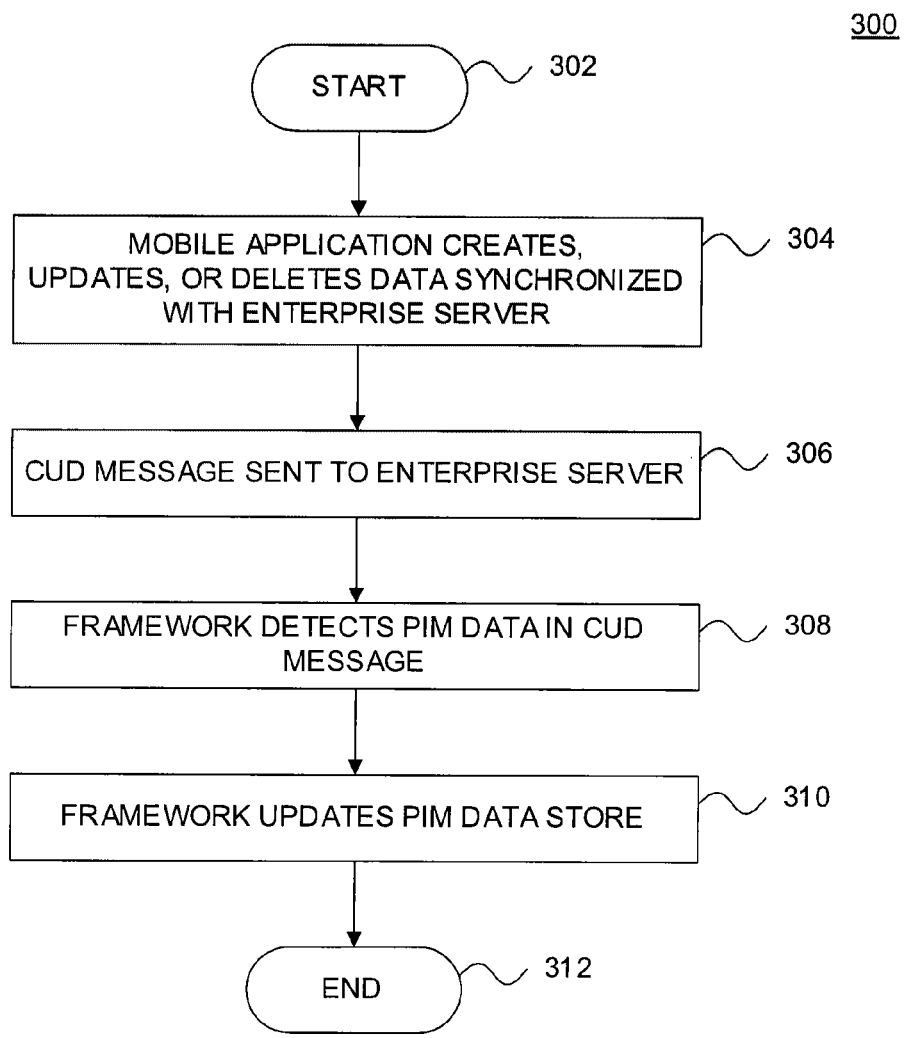
FIG. 3A is a flowchart illustrating steps by which a native PIM store is updated responsive to mobile application data, in accordance with an embodiment of the present invention.

FIG. 3A is a flowchart 300 illustrating steps by which a native PIM store 204 is updated responsive to mobile application 210 data, in accordance with an embodiment of the present invention. The method starts at step 302 and proceeds to step 304 where the mobile application 210 creates, updates, or deletes data which is exchanged with enterprise server 212, in accordance with an embodiment of the present invention. The result of this (c)reation, (u)pdate, or (d)eletion is the generation of a CUD message reflecting the changes in data.

In accordance with an embodiment of the present invention, modification of data by mobile application 210 is handled through the use of download states and pending states stored in a main table of a local database, and an original state stored in an original state table of the local database, depending on the type of operation. Further detail is provided in U.S. patent application No. 61/290,993, filed on Dec. 30, 2009 and entitled "Pending State Management for Mobile Business Objects", which is incorporated herein by reference in its entirety.

In accordance with an embodiment of the present invention, mobile application 210 contains a local data store in which the CUD changes are made. The CUD message is generated once mobile application 210 indicates a desire to commit these changes, at which time multiple pending CUD changes may be merged into a single CUD message.

At step 306, this CUD message is sent to the enterprise server 212 via the framework to which framework PIM component 209 belongs, in accordance with an embodiment of the present invention. In accordance with a further embodiment of the present invention, this CUD message is replayed against data contained within enterprise server 212 in order to perform the same change to its locally stored data.

Framework PIM component 209 detects the presence of PIM data in the CUD message at step 308. In accordance with an embodiment of the present invention, this detection occurs by identifying flagged data, as noted above, which is to be stored in the native PIM store 204. At step 310, framework PIM component 209 updates the native PIM store 204 to include this information, per the mappings indicated within the mapping XML document, in accordance with a further embodiment of the present invention. The method ends at step 312.

When a CUD message is sent to enterprise server 212, the change, update, or deletion will need to be synchronized with the other mobile devices 210 in enterprise network 200, in accordance with an embodiment of the present invention. Moreover, mobile device 210 needs to be informed as to the success or failure of the CUD message. This is accomplished, in accordance with an embodiment of the present invention, by sending a reply message from enterprise server 212 to mobile device 210 indicating the status of the CUD message.

In accordance with a further embodiment of the present invention, the CUD message is transmitted using message based synchronization ("MBS") to an intermediary synchronization server. MBS is described in further detail in U.S. patent application No. 61/290,990, filed on Dec. 30, 2009 and entitled "Message Based Synchronization for Mobile Business Objects", which is incorporated herein by reference in its entirety.

Figure 3B:
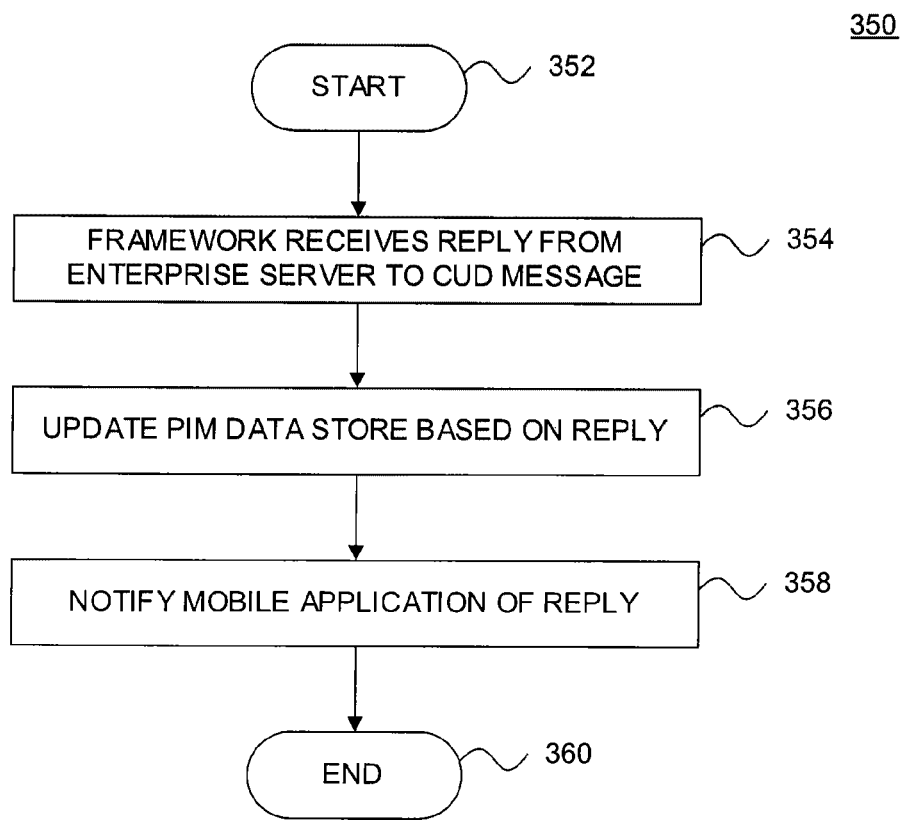
FIG. 3B is a flowchart illustrating steps by which enterprise server provides feedback regarding the CUD message, in accordance with an embodiment of the present invention.

FIG. 3B is a flowchart 350 illustrating steps by which enterprise server 212 provides feedback regarding the CUD message, in accordance with an embodiment of the present invention. The method begins at step 352 and proceeds to step 354 where the framework PIM component 209 receives a reply from enterprise server 212 to the CUD message. Then, to ensure synchronization of data, framework PIM component 209 updates the native PIM store 204 using the reply at step 356, in accordance with an embodiment of the present invention. Mobile application 210 is also notified of the reply at step 358 in order to maintain consistency in its own records, and the method ends at step 360.

This additional update to native PIM data store 204 at step 356 provides for the eventual convergence of the original CUD message, and the actual response to replaying the CUD message at enterprise server 212. However, by having updated the native PIM store 204 upon generation of the CUD message (i.e., when the mobile application 210 originated a creation, update, or deletion), the user sees an immediate response. It is possible, for example, that mobile device 202 is operated in a disconnected state, such as when mobile device 210 is a cellular telephony device and is operated in an area with limited cellular connectivity. In this case, communications with enterprise server 212 may be delayed. If the user updates, for example, contact information within mobile application 210, it is useful from a functionality perspective to have this update reflected immediately within the native PIM store 204. However, in accordance with an embodiment of the present invention, it is possible to skip this initial update (e.g., step 310 of FIG. 3A) and only update upon receipt of a confirming reply message from enterprise server 212.

The reply message from enterprise server 212 may reflect a failure to replay the CUD message against data in enterprise server 212, in accordance with an embodiment of the present invention. The result of this would be a rollback operation, restoring data within mobile application 210 and the native PIM store 204 to their original values. However, until such a reply message is received, the native PIM store 204 would immediately reflect the CUD message based on performance of step 310, in accordance with an embodiment of the present invention.

IV. Data Creates, Updates, or Deletes by Native PIM Application

Framework PIM component 209 further comprises a listener component, in accordance with an embodiment of the present invention. This listener monitors native PIM store 204 for any changes, updates, or deletions, which can then be used by framework PIM component 209 to notify the mobile application 210 to generate a CUD message reflecting these modifications to the native PIM store 204.

Although the listener is primarily interested in detecting modifications to native PIM store 204 made by native PIM applications 208 in order to reflect these changes in mobile application 210 and enterprise server 212, the listener is first configured to detect any modification regardless of source. However, framework PIM component 209 provides a mechanism whereby a unique PIM reference ID is generated when a CUD message is received from either mobile application 210 or enterprise server 212, in accordance with an embodiment of the present invention. When modifications to native PIM store 204 originate from mobile application 210 or enterprise server 212, the listener will nevertheless detect that a modification has been made. However, the result will correlate to one of the existing PIM reference IDs generated by a modification originating at mobile application 210 or enterprise server 212. Based on this correlation, it is known that this modification does not need to be broadcast.

Figure 4:
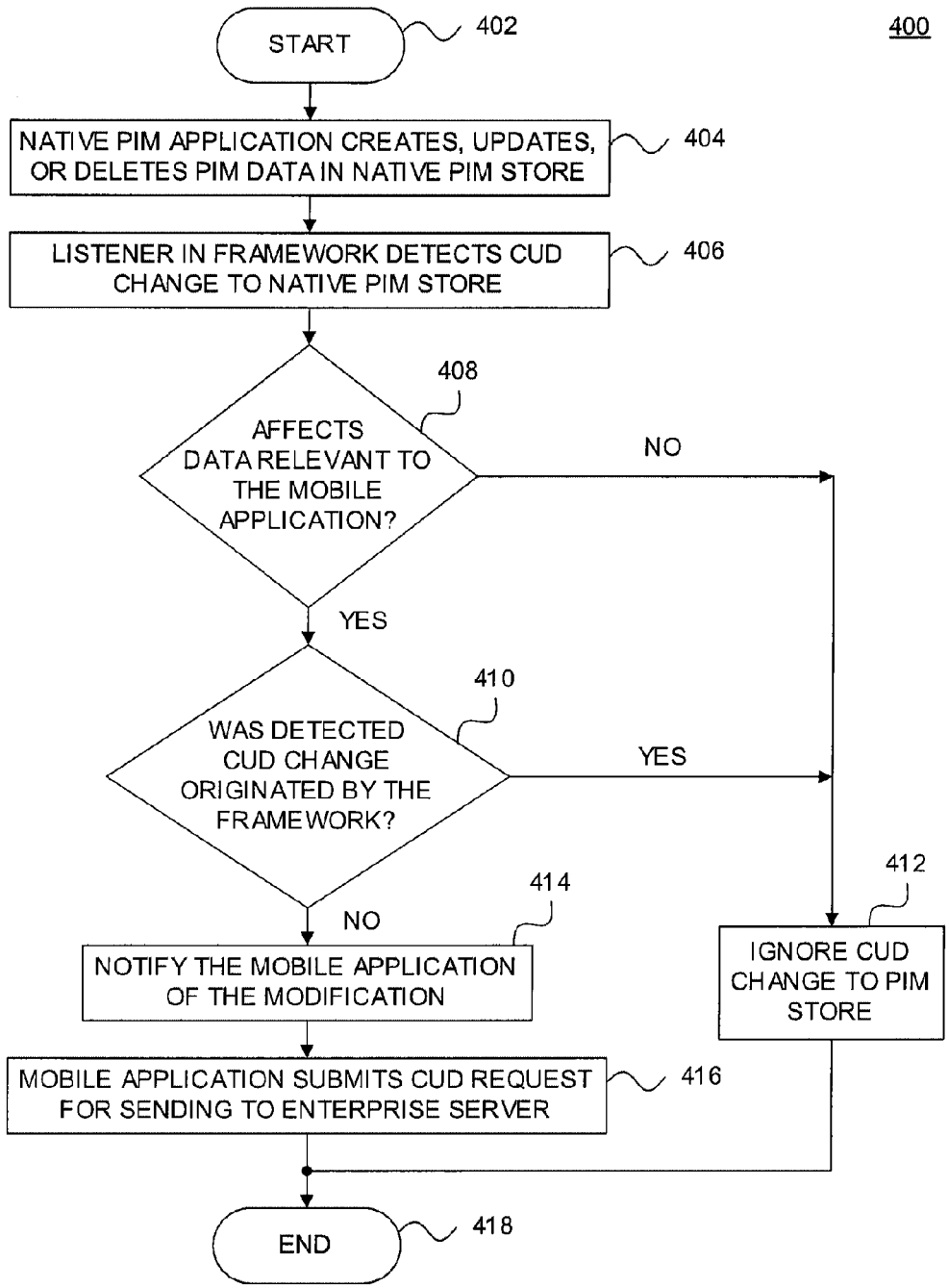
FIG. 4 is a flowchart illustrating steps by which modifications from native PIM applications can be synchronized with a mobile application and an enterprise server, in accordance with an embodiment of the present invention.

Otherwise, it is known that the modification originated with the native PIM application 208, and will need to be transmitted to mobile application 210 and enterprise server 212 in the form of a CUD message. FIG. 4 is a flowchart 400 illustrating steps by which modifications from native PIM applications 208 can be synchronized with the mobile application 210 and enterprise server 212, in accordance with an embodiment of the present invention.

The method begins at step 402 and proceeds to step 404 where a native PIM application performs a creation, update, or deletion of PIM data in the native PIM store 204, in accordance with an embodiment of the present invention. The listener within framework PIM component 209 detects this CUD modification at step 406.

At step 408, a determination is made as to whether this CUD modification affects data relevant to mobile application 210, in accordance with an embodiment of the present invention. In accordance with a further embodiment of the present invention, this relevancy is determined based on data within the PIM data model XML document, as previously discussed. If the CUD modification is not relevant to mobile application 210, then it is ignored at step 412, and the method ends at step 418. Otherwise, the method proceeds to step 410.

As discussed above, framework PIM component 209 is responsible for detecting the source of the modification identified by the listener, in order to prevent the creation of a CUD message where the source was mobile application 210 or enterprise server 212. Accordingly, at step 410, a determination is made as to whether the detected CUD modification was originated by framework PIM component 209 itself. If so, then this modification is ignored at step 412, and the method ends at step 418.

Otherwise, such as when the detected CUD modification was originated by the native PIM application 208, the method proceeds to step 414, where a notification reflecting the detected CUD modification is sent to mobile application 210. Mobile application 210 is then able to apply this CUD modification to its own internal data stores, and generate a CUD request message at step 416 to be transmitted to enterprise server 416. The method ends at step 418.

IV. Data Creates, Updates, or Deletes by Enterprise Server

Figure 5:
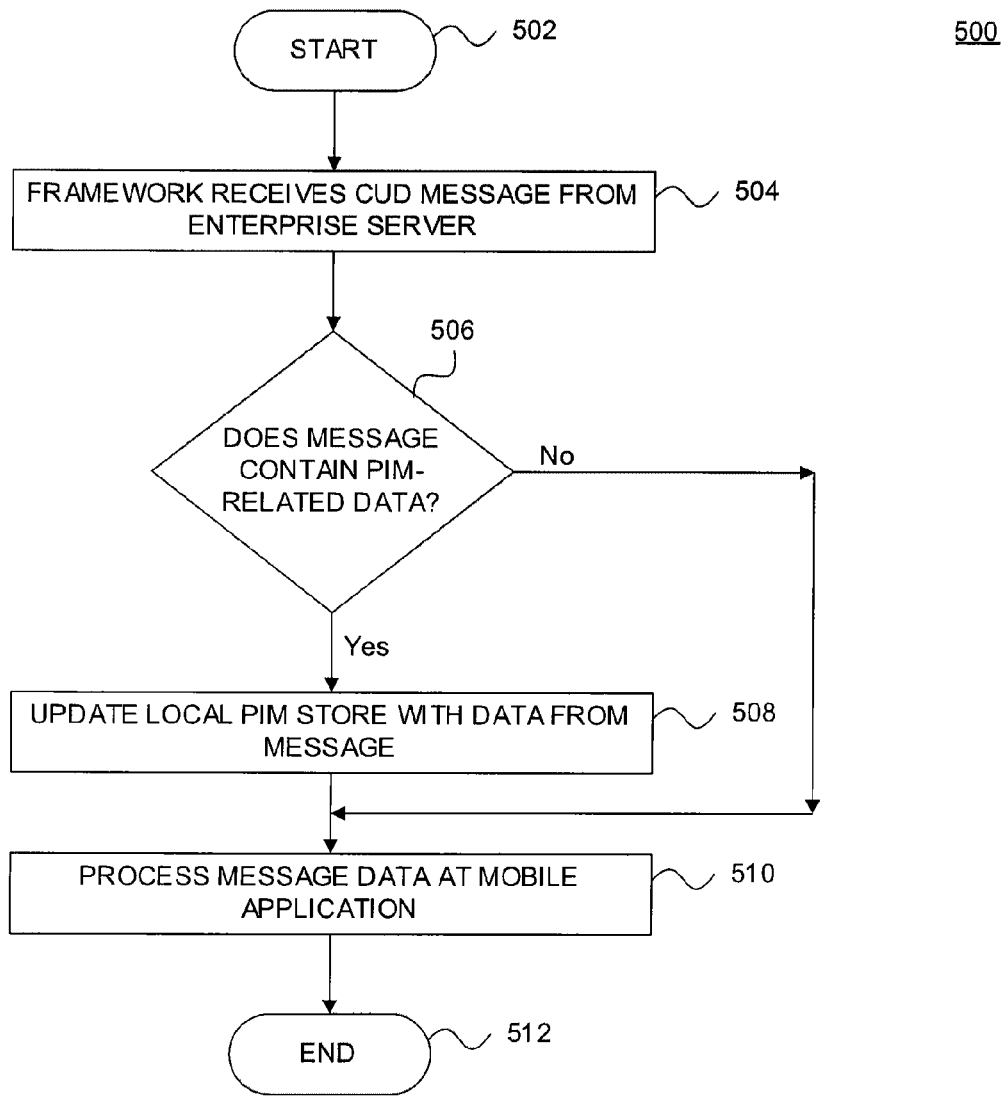
FIG. 5 is a flowchart illustrating steps by which CUD modifications originating at an enterprise server are reflected in a native PIM store, in accordance with an embodiment of the present invention.

FIG. 5 is a flowchart 500 illustrating steps by which CUD modifications originating at enterprise server 212 are reflected in native PIM store 204, in accordance with an embodiment of the present invention. The method begins at step 502 and proceeds to step 504 where the framework to which framework PIM component 209 belongs receives a CUD message from enterprise server 504. The framework is able to analyze the message to determine that, as a CUD message, it should be handled by framework PIM component 209, in accordance with an embodiment of the present invention. This determination is shown at step 506. If the message is other than a CUD message relevant to PIM data, the message is still sent by the framework to the receiving mobile application 210 at step 510 for regular processing.

However, if the message does contain PIM-related data, such as a CUD message, then framework PIM component 209 updates the local PIM store with data from the message at step 508. In similar manner as described above, this update generates a unique PIM reference ID, which is used to correlate the eventual corresponding modification detected by the listener to this requested modification to avoid interpretation of the modification as originating with a native PIM application 208. The method then ends at step 512.

V. Example Computer System Implementation

Figure 6:
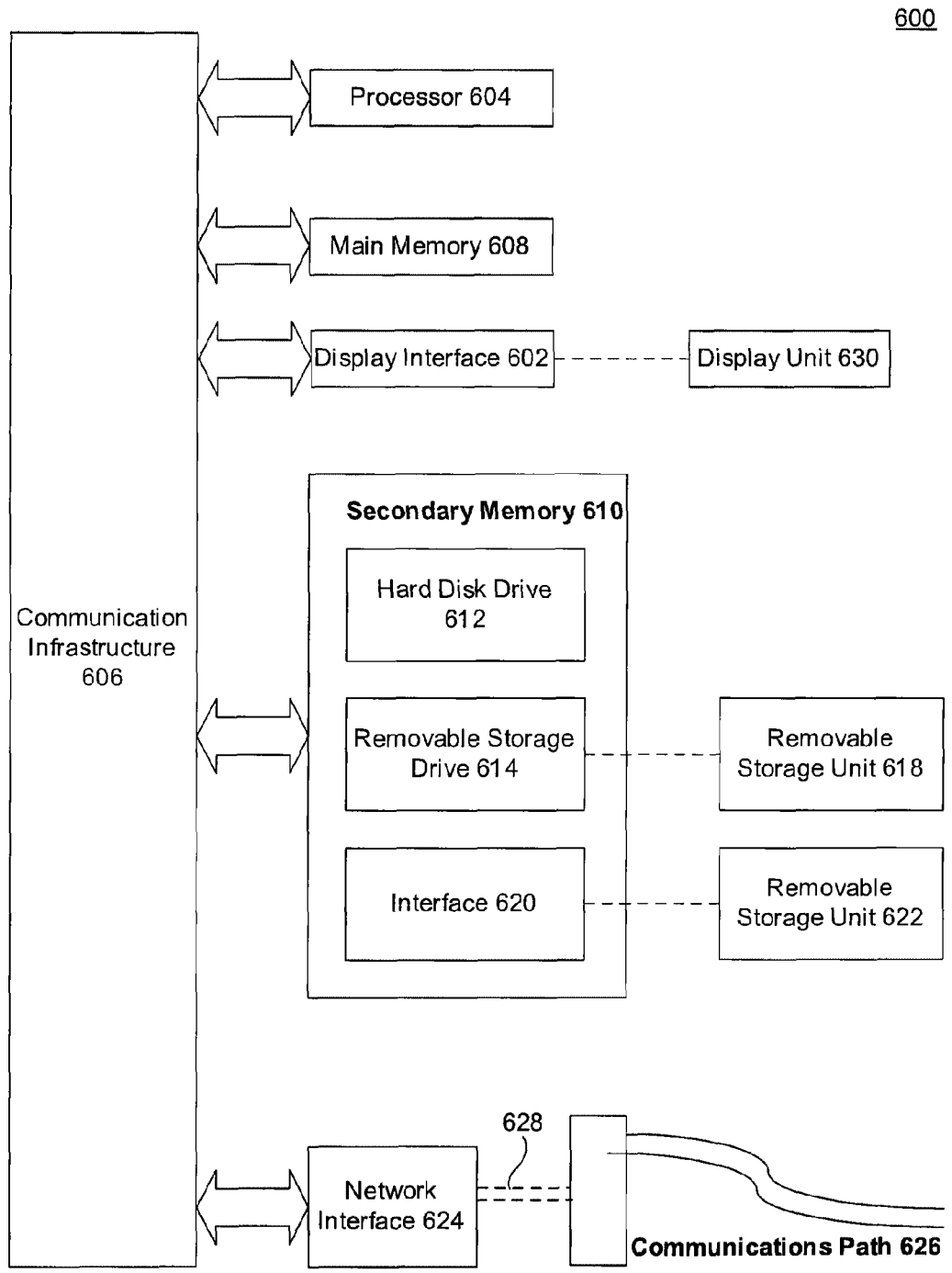
FIG. 6 depicts an example computer system in which embodiments of the present invention may be implemented.

Various aspects of the present invention can be implemented by software, firmware, hardware, or a combination thereof. FIG. 6 illustrates an example computer system 600 in which the present invention, or portions thereof, can be implemented as computer-readable code. For example, the methods illustrated by flowcharts 300 of FIG. 3A, 350 of FIG. 3B, 400 of FIG. 4, and 500 of FIG. 5, can be implemented in system 600. Various embodiments of the invention are described in terms of this example computer system 600. After reading this description, it will become apparent to a person skilled in the relevant art how to implement the invention using other computer systems and/or computer architectures.

Computer system 600 includes one or more processors, such as processor 604. Processor 604 can be a special purpose or a general purpose processor. Processor 604 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive 612, a removable storage drive 614, and/or a memory stick. Removable storage drive 614 may comprise a floppy disk drive, a magnetic tape drive, an optical disk drive, a flash memory, or the like. The removable storage drive 614 reads from and/or writes to a removable storage unit 618 in a well known manner. Removable storage unit 618 may comprise a floppy disk, magnetic tape, optical disk, etc. which is read by and written to by removable storage drive 614. As will be appreciated by persons skilled in the relevant art(s), removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 are in the form of signals which may be electronic, electromagnetic, optical, or other signals capable of being received by communications interface 624. These signals are provided to communications interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Signals carried over communications path 626 can also embody the logic described herein. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the present invention as discussed herein. In particular, the computer programs, when executed, enable processor 604 to implement the processes of the present invention, such as the steps in the methods illustrated by flowcharts 300 of FIG. 3A, 350 of FIG. 3B, 400 of FIG. 4, and 500 of FIG. 5, discussed above. Accordingly, such computer programs represent controllers of the computer system 600. Where the invention is implemented using software, the software may be stored in a computer program product and loaded into computer system 600 using removable storage drive 614, interface 620, hard drive 612 or communications interface 624.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method comprising:
receiving a data modification message in a communication framework on a device capable of mobile use, the communication framework configured to provide platform-independent communications between a mobile application and an enterprise server, wherein the mobile application is a non-native application incapable of interfacing with a native personal information management ("PIM") store using a native PIM API (Application Programming Interface);
identifying, by the communication framework on the device, a modification to PIM-related data within the message
updating, by the communication framework, the native PIM store within the device based on the message, wherein the native PIM store is platform-dependent;
transmitting the message to the enterprise server;

receiving a reply from the enterprise server; and performing an additional update of the native PIM store based on the reply.

2. The method of claim 1, further comprising:

transmitting the message to the enterprise server, if the message originated at the mobile application, or to the mobile application, if the message originated at the enterprise server.

3. The method of claim 2, wherein the message reflects a change, update, or deletion of data within the mobile application or the enterprise server.

4. The method of claim 1, wherein the enterprise server receives the transmitted message and replays the data modification, the reply comprising a status reflecting the success or failure of the replay operation.

5. The method of claim 1, wherein updating the native PIM store comprises:

correlating data within the message to fields within the native PIM store based on an XML document.

6. A non-transitory computer-readable storage device having computer-executable instructions stored thereon, execution of which, by a computing device, causes the computing device to perform operations comprising:

receiving a data modification message in a communication framework on a device capable of mobile use, the communication framework configured to provide platform-independent communications between a mobile application and an enterprise server, wherein the mobile application is a non-native application incapable of interfacing with a native personal information management ("PIM") store using a native PIM API (Application Programming Interface);

identifying a modification to PIM-related data within the message;

updating the native PIM store within the device based on the message;

transmitting the message to the enterprise server;

receiving a reply from the enterprise server; and performing an additional update of the native PIM store based on the reply.

7. The non-transitory computer-readable storage device of claim 6, the operations further comprising:

transmitting the message to the enterprise server, if the message originated at the mobile application, or to the mobile application, if the message originated at the enterprise server.

8. The non-transitory computer-readable storage device of claim 7, wherein the message reflects a change, update, or deletion of data within the mobile application or enterprise server.

9. The non-transitory computer-readable storage device of claim 6, wherein the enterprise server receives the transmitted message and replays the data modification, the reply comprising a status reflecting the success or failure of the replay operation.

10. The non-transitory computer-readable storage device of claim 6, wherein updating the native PIM store comprises:

correlating data within the message to fields within the native PIM store based on an XML document.

11. A system comprising:

a memory configured to store modules comprising:

a receiving module configured to receive a data modification message in a communication framework on a device capable of mobile use, the communication framework configured to provide platform-independent communications between a mobile application and an enterprise server, wherein the mobile application is a non-native application incapable of interfacing with a native personal information management ("PIM") store using a native PIM API (Application Programming Interface), an identifying module configured to identify a modification to PIM-related data within the message using the communication framework, an updating module configured to update the native PIM store within the device based on the message using the communication framework, wherein the native PIM store is platform-dependent, a transmitting module configured to transmit the message to the enterprise server the receiving module configured to receive a reply from the enterprise server the updating module configured to perform an additional update of the native PIM store based on the reply, and one or more processors configured to process the modules.

12. A method comprising:

monitoring a native personal information management ("PIM") store within a mobile device for data modifications therein, wherein the native PIM store is platform-dependent;

detecting a modification to data within the native PIM store using a communication framework configured to provide platform-independent communications between a mobile application on the mobile device and an enterprise server, wherein the mobile application is a non-native application incapable of interfacing with the native PIM store using a native PIM API (Application Programming Interface);

notifying the mobile application executing on the mobile device of the modification using the communication framework;

transmitting a message reflecting the modification to the enterprise server using the communication framework;

receiving a reply from the enterprise server; and performing an additional update of the native PIM store based on the reply.

13. The method of claim 12, further comprising:

determining whether the modification affects data relevant to the mobile application based on an XML document.

14. The method of claim 12, further comprising:

determining whether the modification was generated by the mobile application or the enterprise server based on correlation of an identifier associated with the modification and, if so, ignoring the modification.

15. A non-transitory computer-readable storage device having computer-executable instructions stored thereon, execution of which, by a computing device, causes the computing device to perform operations comprising:

monitoring a native personal information management ("PIM") store within a mobile device for data modifications therein, wherein the native PIM store is platform-dependent;

detecting a modification to data within the native PIM store using a communication framework configured to provide platform-independent communications between a mobile application on the mobile device and an enterprise server, wherein the mobile application is a non-native application incapable of interfacing with the native PIM store using a native PIM API (Application Programming Interface);

notifying the mobile application executing on the mobile device of the modification using the communication framework;

transmitting a message reflecting the modification to the enterprise server using the communication framework;
receiving a reply from the enterprise server; and
performing an additional update of the native PIM store based on the reply.

16. The non-transitory computer-readable storage device of claim 15, the operations further comprising:
determining whether the modification affects data relevant to the mobile application based on an XML document.

17. The non-transitory computer-readable storage device of claim 15, the operations further comprising:
determining whether the modification was generated by the mobile application or the enterprise server based on correlation of an identifier associated with the modification and, if so, ignoring the modification.

18. A system comprising:
a memory configured to store modules comprising:
a monitoring module configured to monitor a native personal information management ("PIM") store within a mobile device for data modifications therein, wherein the native PIM store is platform-dependent,
a detecting module configured to detect a modification to data within the native PIM store using a communication framework configured to provide platform-independent communications between a mobile application on the mobile device and an enterprise server, wherein the mobile application is a non-native application incapable of interfacing with the native PIM store using a native PIM API (Application Programming Interface),
a notifying module configured to notify the mobile application executing on the mobile device of the modification using the communication framework,
a transmitting module configured to transmit a message reflecting the modification to the enterprise server using the communication framework,
a receiving module configured to receive a reply from the enterprise server,
an updating module configured to perform an additional update of the native PIM store based on the reply, and
one or more processors configured to process the modules.

* * * * *